(12) United States Patent
Dagrossa

(10) Patent No.: US 9,840,216 B2
(45) Date of Patent: Dec. 12, 2017

(54) TRANSPARENT BUMPER GUARD

(71) Applicant: Darrin Dagrossa, Douglaston, NY (US)

(72) Inventor: Darrin Dagrossa, Douglaston, NY (US)

( * ) Notice: Subject to any disclaimer, the term of this patent is extended or adjusted under 35 U.S.C. 154(b) by 48 days.

(21) Appl. No.: 14/978,836

(22) Filed: Dec. 22, 2015

(65) Prior Publication Data

US 2017/0174161 A1  Jun. 22, 2017

(51) Int. Cl.
  *B60R 19/44*  (2006.01)

(52) U.S. Cl.
  CPC .................... *B60R 19/44* (2013.01)

(58) Field of Classification Search
  CPC ........................................... B60R 19/44
  See application file for complete search history.

(56) References Cited

U.S. PATENT DOCUMENTS

| | | |
|---|---|---|
| 4,168,855 A | 9/1979 | Koch |
| 5,618,073 A | 4/1997 | Criscone |
| 7,073,630 B2 | 7/2006 | Chen et al. |
| 7,073,830 B1 | 7/2006 | Chen et al. |
| D618,600 S | 6/2010 | Lorenzo |
| D619,060 S | 7/2010 | Lorenzo |
| 8,531,282 B1 * | 9/2013 | Santiago ............... B60R 19/483 293/119 |
| 2003/0034660 A1 | 2/2003 | Kelly |
| 2005/0028912 A1 | 2/2005 | Schnarr |
| 2007/0290515 A1 | 12/2007 | Doan |
| 2008/0116703 A1 | 5/2008 | Malina |
| 2009/0026775 A1 | 1/2009 | Bogdan |
| 2010/0276951 A1 | 11/2010 | Malina et al. |
| 2011/0198874 A1 | 8/2011 | Lee et al. |
| 2014/0130388 A1 | 5/2014 | McCormick |
| 2015/0183365 A1 | 7/2015 | Aboughanem |

FOREIGN PATENT DOCUMENTS

WO  97/16328  5/1997

* cited by examiner

*Primary Examiner* — Glenn Dayoan
*Assistant Examiner* — Melissa A Black
(74) *Attorney, Agent, or Firm* — Richard L. Miller

(57) ABSTRACT

A protector that replaceably attaches to, and protects without obscuring, one of a front bumper cover of a vehicle and a rear bumper cover of the vehicle. The front bumper cover of the vehicle has a top and a pair of sides. The rear bumper cover of the vehicle has a top and a pair of sides. The vehicle has a grille, a pair of front wheel wells, a trunk, and a pair of rear wheel wells. The protector includes a body and an attaching apparatus. The body overlies, and protects without obscuring, the one of the front bumper cover of the vehicle and the rear bumper cover of the vehicle. The attaching apparatus is disposed on the body, and replaceably attaches the body to the one of the front bumper cover of the vehicle and the rear bumper cover of the vehicle.

75 Claims, 5 Drawing Sheets

TRANSPARENT BUMPER GUARD

BACKGROUND OF THE INVENTION

Field of the Invention

The present invention relates to a bumper cover protector, and more particularly, a transparent bumper cover protector.

Description of the Prior Art

Numerous innovations for bumper protectors have been provided in the prior art that will be described. Even though these innovations may be suitable for the specific individual purposes to which they address, however, they differ from the present invention.

A FIRST EXAMPLE, U.S. Pat. No. 4,168,855, Issued on Sep. 25, 1979, to Koch teaches a light-weight resilient vehicle protection bumper assembly including resilient bumper bars clamped to a vehicle chassis, which extend across the width of the vehicle at its front end (in some cases also at its rear end). The bumper bars is formed from transparent polycarbonate tubing, mounted in rubber.

A SECOND EXAMPLE, U.S. Pat. No. 5,618,073, Issued on Apr. 8, 1997, to Criscione teaches a protective cover for covering the outer surface of a rear bumper of a motor vehicle. The protective cover includes a single panel of flexible material, or alternatively, two panels of flexible material and a central portion formed from a transparent polymer that provides visual access to a rear license plate that may be located in a recess formed in the rear bumper. The protective cover is secured in place across the rear bumper by straps that are looped through attachment handles affixed to the motor vehicle's rear wheel.

A THIRD EXAMPLE, U.S. Pat. No. 7,073,830, Issued on Jul. 11, 2006, to Chen, et al. teaches a bumper protection device for automobile bumpers to shield the bumpers from impact, which attaches to the automobile by a fabric shroud that attaches around the hood and trunk latch and suspends an impact resisting padded guard portion, adapted to the vehicle bumper, covering the entire front or rear bumper. The padded guard portion is drawn partially around the sides of the bumper and anchored by at least one elastic strap attached to opposing ends of the bumper guard portion. Each elastic strap is further attached to the tires or wheel wells of the automobile thereby retaining the bumper protection device over the entire rear bumper surface and around the sides of the bumper.

A FOURTH EXAMPLE, U.S. Pat. No. Des. 618,600, Issued on Jun. 29, 2010, to Lorenzo teaches the ornamental design for an adjustable automobile bumper protector.

A FIFTH EXAMPLE, U.S. Pat. No. Des. 619,060, Issued on Jul. 6, 2010, to Lorenzo teaches the ornamental design for an adjustable automobile bumper protector.

A SIXTH EXAMPLE, U.S. Patent Office Document No. 2003/0034660, Published on Feb. 20, 2003, to Kelly teaches a portable cushion protector that is attachable to, and detachable from, the rear portions of an automobile, and which protects its rear bumper from scratches and other damage while it is parked. The cushion protector has supporting mechanisms that may be attached to the automobile trunk for holding the cushion securely in place upon the bumper.

A SEVENTH EXAMPLE, U.S. Patent Office Document No. 2007/0290515, Published on Dec. 20, 2007, to Doan teaches an apparatus for protection of a vehicle from damage by other vehicles attempting to undesirably encroach to the front or rear of the vehicle. The apparatus includes extendable and retractable bumper portions that when extended form a safety enclosure for activities at the rear of a vehicle. The apparatus includes sensors for monitoring encroaching objects and may be electrically or hydraulically operated, either automatically or upon demand.

AN EIGHTH EXAMPLE, U.S. Patent Office Document No. 2011/0198874, Published on Aug. 18, 2011, to Lee, et al. teaches a removable, padded, and vinyl panel to be fastened over the rear bumper of a vehicle, the intent of which is to protect the bumper from scratches, dents, and dings. Manufactured by the Motor Vehicle Parts and Accessories industry, Standard Industrial Code 3714, the custom bumper protector is produced in a tough, durable, and UV-resistant vinyl material, with an interior lining of impact-absorbing cellular synthetic foam. While the custom bumper protector is manufactured in a wide variety of lengths and widths, depending on the model of car, pickup, van, or SUV being fitted, the basic model is tapered, incorporating two side panels approximately three and one half feet in length and approximately five and one half inches in width, which extend to cover the sides of the bumper; and a longer, wider, approximately five and one half feet by approximately nine inch panel which covers the rear of the bumper. The custom bumper cover is equipped with a double-stitched flange, lip, or apron designed to slip under the vehicle's trunk-lid, which is closed in order to secure the custom bumper cover, and the side guard sections of the custom bumper cover fasten by way of VELCRO®-equipped straps.

It is apparent now that numerous innovations for bumper protectors have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a transparent bumper protector that avoids the disadvantages of the prior art.

ANOTHER OBJECT of the present invention is to provide a transparent bumper protector that is simple and inexpensive to manufacture.

STILL ANOTHER OBJECT of the present invention is to provide a transparent bumper protector that is simple to use.

BRIEFLY STATED, STILL YET ANOTHER OBJECT of the present invention is to provide a protector that replaceably attaches to, and protects without obscuring, one of a front bumper cover of a vehicle and a rear bumper cover of the vehicle. The front bumper cover of the vehicle has a top and a pair of sides. The rear bumper cover of the vehicle has a top and a pair of sides. The vehicle has a grille, a pair of front wheel wells, a trunk, and a pair of rear wheel wells. The protector includes a body and an attaching apparatus. The body overlies, and protects without obscuring, the one of the front bumper cover of the vehicle and the rear bumper cover of the vehicle. The attaching apparatus is disposed on the body, and replaceably attaches the body to the one of the front bumper cover of the vehicle and the rear bumper cover of the vehicle.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

A MARSHALING OF REFERENCE NUMERALS UTILIZED IN THE DRAWING

Figure 1:
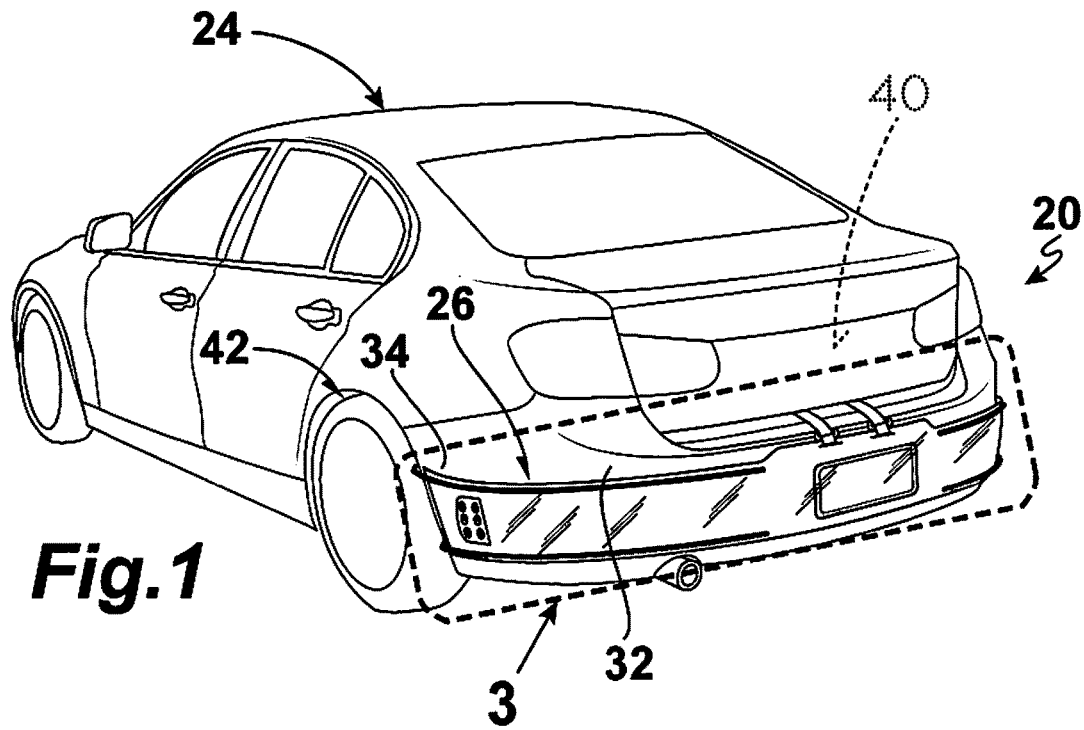
FIG. 1 is a diagrammatic perspective view of a vehicle illustrating an embodiment of the transparent bumper protector installed on a rear end thereof.

Introductory 20 protector of embodiments of present invention for replaceably attaching to, and for protecting without obscuring, one of front bumper cover 22 of vehicle 24 and rear bumper cover 26 of vehicle 24
22 front bumper cover 22 of vehicle 24
24 vehicle
26 rear bumper cover 26 of vehicle 24
28 top of front bumper cover 22 of vehicle 24
30 pair of sides of front bumper cover 22 of vehicle 24
32 top of rear bumper cover 26 of vehicle 24
34 pair of sides of rear bumper cover 26 of vehicle 24
36 grille of vehicle 24
38 pair of front wheel wells of vehicle 24
40 trunk of vehicle 24
42 pair of rear wheel wells of vehicle 24

Overall Configuration of Protector 20

44 body for overlying, and for protecting without obscuring, one of front bumper cover 22 of vehicle 24 and rear bumper cover 26 of vehicle 24
46 attaching apparatus for replaceably attaching body 44 to one of front bumper cover 22 of vehicle 24 and rear bumper cover 26 of vehicle 24

Specific Configuration of Body 44

48 main portion of body 44 for overlying, and protecting without obscuring, one of front bumper cover 22 of vehicle 24 and rear bumper cover 26 of vehicle 24
50 pair of wing portions of body 44 for overlying, and protecting without obscuring, one of pair of sides 30 of front bumper cover 22 of vehicle and pair of sides 34 of rear bumper cover 26 of vehicle 24
52 imaginary opposing ends of main portion 48 of body 44
54 imaginary upper boundary of main portion 48 of body 44
56 convex ends of pair of wing portions of body 44, respectively
58 inner layer of body 44 for overlying, and protecting without obscuring, one of front bumper cover 22 of vehicle 24 and rear bumper cover 26 of vehicle 24
60 outer layer of body 44
62 space of body 44 for inserting bumper sticker therein so as not to have to remove protector 20 to stick bumper sticker on one of front bumper cover 22 of vehicle 24 and rear bumper cover 26 of vehicle 24
64 flap of body 44 for folding over one of top 28 of front bumper cover 22 of vehicle 24 and top 32 of rear bumper cover 26 of vehicle 24, and when folding over top 32 of rear bumper cover 26 of vehicle 24, extends into trunk 40 of vehicle 24
66 pair of through slots of flap 64 of body 44
68 upper edge of body 44
70 lower edge of body 44
72 pair of tape strips of body 44

Specific Configuration of Attaching Apparatus 46

74 two pair of attaching strip pieces of attaching apparatus 46 for replaceably engaging in one of pair of front wheel wells 38 of vehicle 24 when protector 20 is attached to front bumper cover 22 of vehicle 24 and pair of rear wheel wells 42 of vehicle 24 when protector 20 is attached to rear bumper cover 26 of vehicle 24
76 core of each attaching strip piece of two pair of attaching strip pieces 74 of attaching apparatus 46 for allowing two pair of attaching strip pieces 74 of attaching apparatus 46 to bend into one of pair of front wheel wells 38 of vehicle 24 when protector 20 is attached to front bumper cover 22 of vehicle 24 and pair of rear wheel wells 42 of vehicle 24 when protector 20 is attached to rear bumper cover 26 of vehicle 24 and for allowing two pair of attaching strip pieces 74 of attaching apparatus 46 to bend out of one of pair of front wheel wells 38 of vehicle 24 when protector 20 is to be removed from front bumper cover 22 of vehicle 24 and pair of rear wheel wells 42 of vehicle 24 when protector 20 is to be removed from rear bumper cover 26 of vehicle 24
78 coated skin of each attaching strip piece of two pair of attaching strip pieces 74 of attaching apparatus 46 for preventing damage to one of front bumper cover 22 of vehicle 24 when protector 20 is attached to front bumper cover 22 of vehicle 24 and rear bumper cover 26 of vehicle 24 when protector 20 is attached to rear bumper cover 26 of vehicle 24
80 pair of suction cup assemblies of attaching apparatus 46 for replaceably attaching pair of wing portions 50 of body 44 to one of pair of sides 30 of front bumper cover 22 of vehicle 24, respectively, and pair of sides 34 of rear bumper cover 26 of vehicle 24, respectively
82 base plate of each suction cup assembly of pair of suction cup assemblies 80 of attaching apparatus 46.
84 plurality of suction cups of each suction cup assembly of pair of suction cup assemblies 80 of attaching apparatus 46 for replaceably attaching associated wing portion 50 of body 44 to one of associated side 30 of front bumper cover 22 of vehicle and associated side 34 of rear bumper cover 26 of vehicle 24
- 86 pair of straps of attaching apparatus 46
- 88 proximal end of each strap of pair of straps 86 of attaching apparatus 46
- 90 distal end of each strap of pair of straps 86 of attaching apparatus 46 for entering trunk 40 of vehicle 24 when protector 20 is replaceably attached to rear bumper cover 26 of vehicle 24 and is for replaceably attaching to grille 36 of vehicle 24 when protector 20 is replaceably attached to front bumper cover 22 of vehicle 24
- 92 pair of opposing axial surfaces of each strap of pair of straps 86 of attaching apparatus 46
- 94 adjuster ring of proximal end 88 of each strap of pair of straps 86 of attaching apparatus 46 for adjusting length of each strap of pair of straps 86 of attaching apparatus 46 so as to allow each strap of pair of straps 86 of attaching apparatus 46 to fit snugly along top 32 of rear bumper cover 26 of vehicle 24 when protector 20 is replaceably attached to rear bumper cover 26 of vehicle 24
- 96 mating portions of hook and loop fasteners of pair of opposing axial surfaces 92 of each strap of pair of straps 86 of attaching apparatus 46 have, respectively, so as to allow pair of opposing axial surfaces 92 of each strap of pair of straps 86 of attaching apparatus 46 to replaceably attach to themselves
- 98 loop of distal end 90 of each strap of pair of straps 86 of attaching apparatus 46
- 100 rod of attaching apparatus 46 for positioning in, and against, trunk 40 of vehicle 24 when protector 20 is replaceably attached to rear bumper cover 26 of vehicle 24
- 102 pair of ends of rod 100 of attaching apparatus 46

DETAILED DESCRIPTION OF THE PREFERRED EMBODIMENT

Introductory

Figure 2:
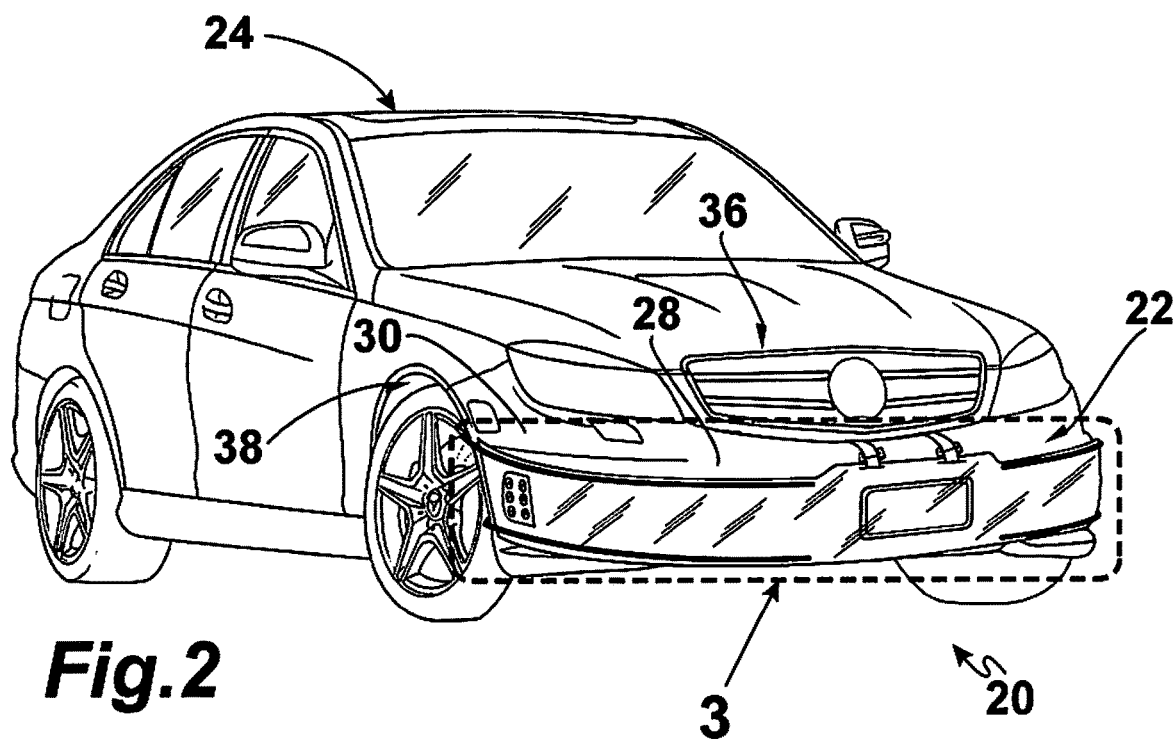
FIG. 2 is a diagrammatic perspective view of a vehicle illustrating an embodiment of the transparent bumper protector installed on a front end thereof.
Figure 3:
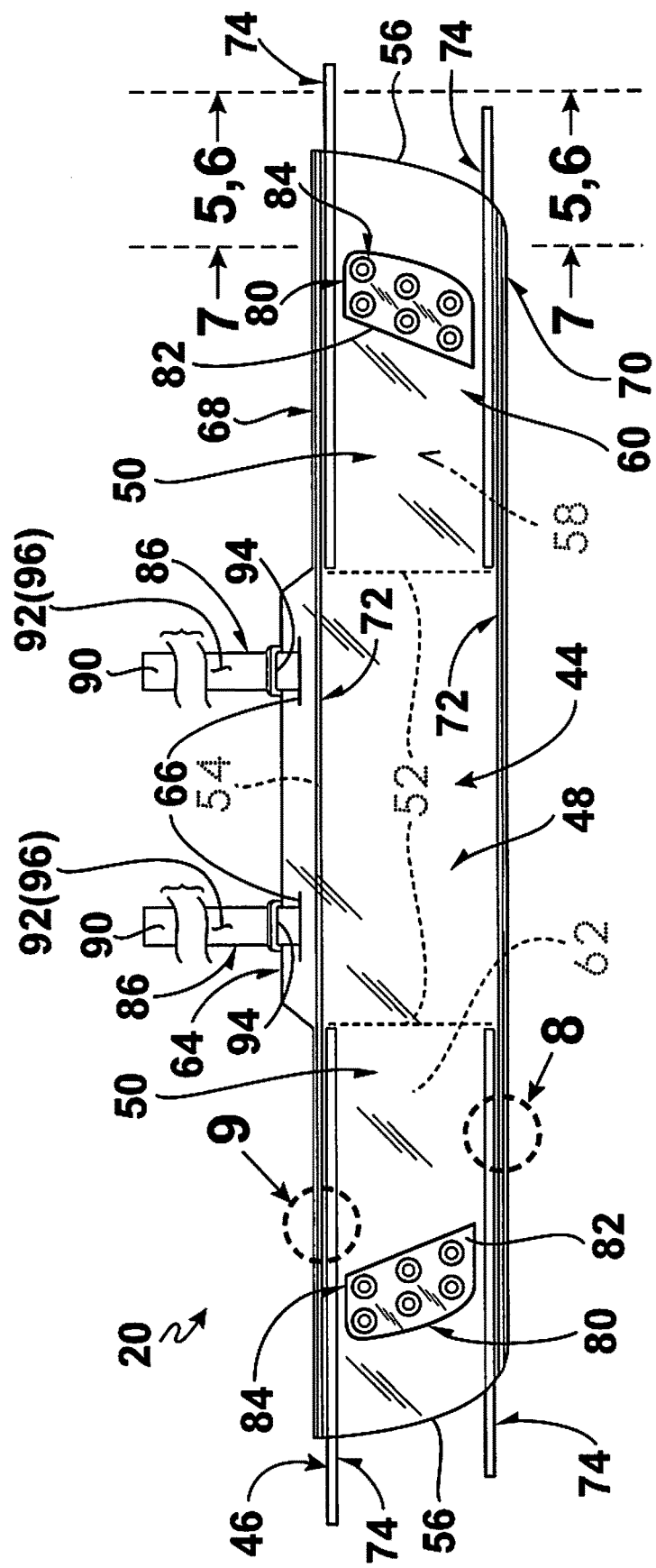
FIG. 3 is an elevational view of an embodiment of the transparent bumper protector per se shown enclosed in dotted curve indicated by arrow 3 in FIGS. 1 and 2.
Figure 4:
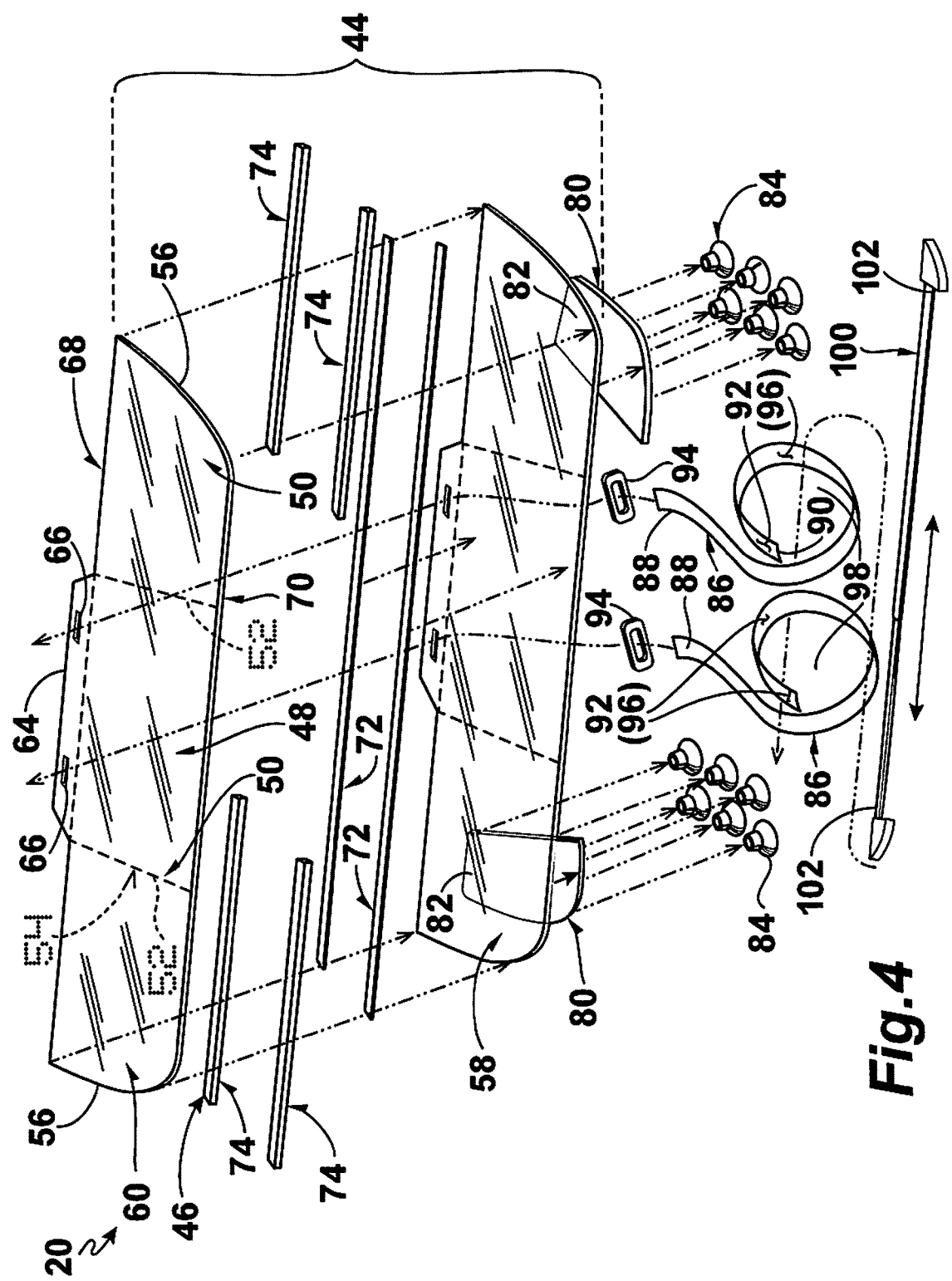
FIG. 4 is an exploded perspective assembly view thereof.
Figure 10:
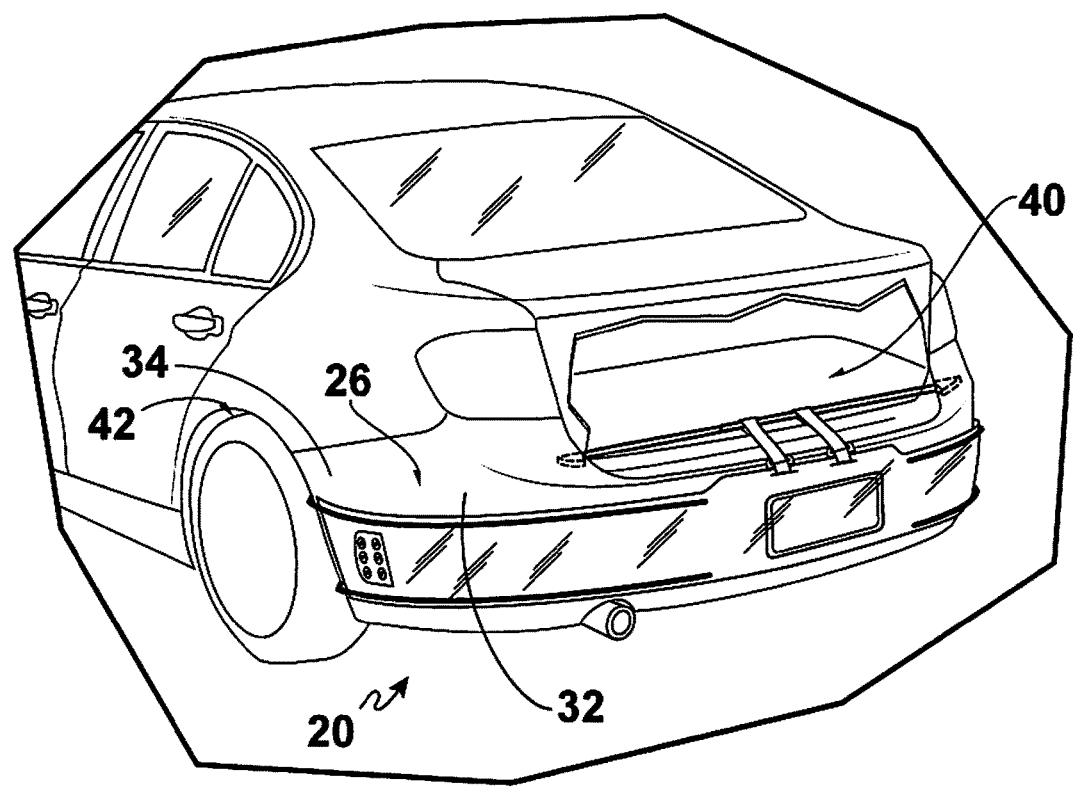
FIG. 10 is another diagrammatic perspective view of a vehicle illustrating an embodiment of the transparent bumper protector installed on the rear end thereof, illustrating use of an expandable securement rod.

Referring now to the figures, in which like numerals indicate like parts, and particularly to FIGS. 1, 2, and 10, the protector of the embodiments of the present invention is shown generally at 20 for replaceably attaching to, and for protecting without obscuring, one of a front bumper cover 22 of a vehicle 24 (FIG. 2) and a rear bumper cover 26 of the vehicle 24 (FIGS. 1 and 10), wherein the front bumper cover 22 of the vehicle 24 has a top 28 and a pair of sides 30, wherein the rear bumper cover 26 of the vehicle 24 has a top 32 and a pair of sides 34, and wherein the vehicle 24 has a grille 36 (FIG. 2), a pair of front wheel wells 38 (FIG. 2), a trunk 40 (FIGS. 1 and 10), and a pair of rear wheel wells 42 (FIGS. 1 and 10).

Overall Configuration of the Protector 20

The overall configuration of the protector 20 can best be seen in FIGS. 3, 4, 8, and 9, and as such, will be discussed with reference thereto.

The protector 20 comprises a body 44 and an attaching apparatus 46. The body 44 is for overlying, and for protecting without obscuring, the one of the front bumper cover 22 of the vehicle 24 and the rear bumper cover 26 of the vehicle 24. The attaching apparatus 46 is disposed on the body 44, and is for replaceably attaching the body 44 to the one of the front bumper cover 22 of the vehicle 24 and the rear bumper cover 26 of the vehicle 24.

Specific Configuration of the Body 44

The body 44 comprises a main portion 48 and a pair of wing portions 50.

The main portion 48 of the body 44 comprises imaginary opposing ends 52 and an imaginary upper boundary 54.

The pair of wing portions 50 of the body 44 extend taperingly outwardly from the imaginary opposing ends 52 of the main portion 48 of the body 44 to convex ends 56, respectively, and are for overlying, and protecting without obscuring, one of the pair of sides 30 of the front bumper cover 22 of the vehicle and the pair of sides 34 of the rear bumper cover 26 of the vehicle 24.

The main portion 48 of the body 44 is generally rectangular-shaped, and is for overlying, and protecting without obscuring, the one of the front bumper cover 22 of the vehicle 24 and the rear bumper cover 26 of the vehicle 24.

The body 44 is transparent for protecting without obscuring at least one of the front bumper cover 22 of the vehicle 24, the rear bumper cover 26 of the vehicle 24, and a license plate thereon.

The body 44 is made from one of vinyl, rubber, and combinations thereof for conforming to the one of the front bumper cover 22 of the vehicle 24 and the rear bumper cover 26 of the vehicle 24.

The body 44 further comprises an inner layer 58 and an outer layer 60.

The inner layer 58 of the body 44 is for overlying, and protecting without obscuring, the one of the front bumper cover 22 of the vehicle 24 and the rear bumper cover 26 of the vehicle 24.

The outer layer 60 of the body 44 overlies the inner layer 58 of the body 44, with a space 62 therebetween. The space 62 of the body 44 is for inserting a bumper sticker therein so as not to have to remove the protector 20 to stick the bumper sticker on the one of the front bumper cover 22 of the vehicle 24 and the rear bumper cover 26 of the vehicle 24.

The body 44 further comprises a flap 64.

The flap 64 of the body 44 extends upwardly from the imaginary upper boundary 54 of the main portion 48 of the body 44, is generally trapezoid-shaped, and is for folding over one of the top 28 of the front bumper cover 22 of the vehicle 24 and the top 32 of the rear bumper cover 26 of the vehicle 24, and when folding over the top 32 of the rear bumper cover 26 of the vehicle 24, extends into the trunk 40 of the vehicle 24.

The flap 64 of the body 44 has a pair of through slots 66.

The pair of through slots 66 of the flap 64 of the body 44 are axially spaced-apart from each other.

The body 44 further comprises an upper edge 68 and a lower edge 70.

The body 44 further comprises a pair of tape strips 72.

The pair of tape strips 72 of the body 44 extend axially between the outer layer 60 of the body 44 and the inner layer 58 of the body 44, from the convex end 56 of one wing portion 50 of the body 44 to the convex end 56 of the other wing portion 50 of the body 44, and along the upper edge 68 of the body 44 and the lower edge 70 of the body 44, respectively, are vertically spaced-apart from each other, are parallel to each other, and are slender and elongated.

The pair of tape strips 72 of the body 44 are at least one of reflective and holographic.

Specific Configuration of the Attaching Apparatus 46

The specific configuration of the attaching apparatus 46 can best be seen in FIGS. 3-5 and 7, and as such, will be discussed with reference thereto.

The attaching apparatus 46 comprises two pair of attaching strip pieces 74.

The two pair of attaching strip pieces 74 of the attaching apparatus 46 extend axially along the pair of wing portions 50 of the body 44, respectively, to past the convex ends 56 of the pair of wing portions 50 of the body 44, respectively, between the outer layer 60 of the body 44 and the inner layer 58 of the body 44, are disposed inwardly adjacent to the pair of tape strips 72 of the body 44, respectively, are vertically spaced-apart from each other, are parallel to each other, are slender and elongated, and are for replaceably engaging in one of the pair of front wheel wells 38 of the vehicle 24 when the protector 20 is attached to the front bumper cover 22 of the vehicle 24 and the pair of rear wheel wells 42 of the vehicle 24 when the protector 20 is attached to the rear bumper cover 26 of the vehicle 24.

Figure 5:
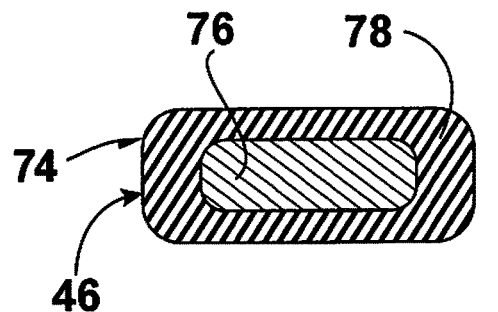
FIG. 5 is a cross sectional view taken on line 5-5 in FIG. 3 of a first embodiment of a component thereof.
Figure 6:
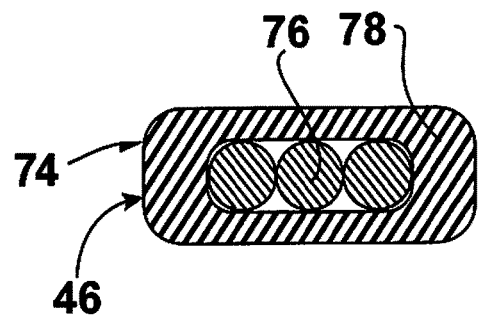
FIG. 6 is a cross sectional view taken on line 6-6 in FIG. 3 of a second embodiment of a component thereof.
Figure 7:
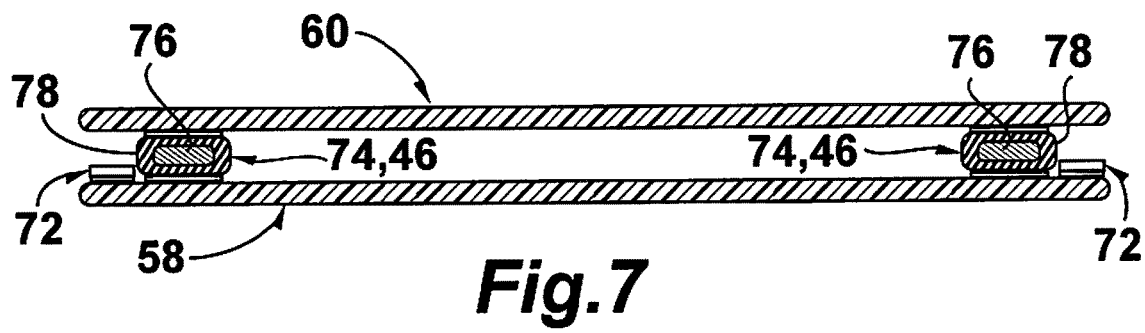
FIG. 7 is a cross sectional view taken on line 7-7 in FIG. 3.
Figure 8:
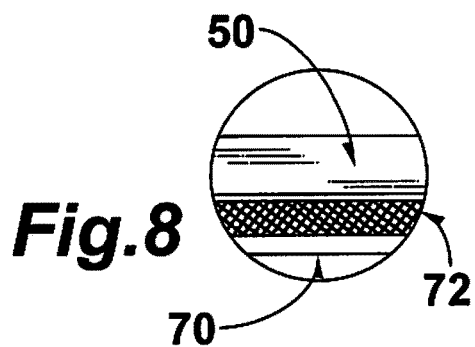
FIG. 8 is an enlarged view of the area inclosed in the dotted circle indicated by arrow 8 in FIG. 3 with hatching indicating holograph surface.
Figure 9:
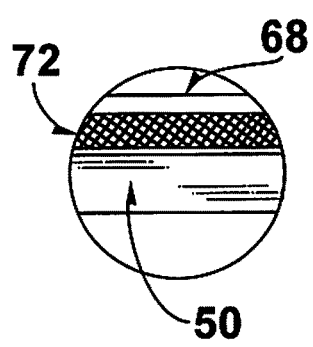
FIG. 9 is an enlarged view of the area inclosed in the dotted circle indicated by arrow 9 in FIG. 3 with hatching indicating holograph surface.

As shown in FIGS. 5-7, each attaching strip piece 74 of the attaching apparatus 46 comprise a core 76 covered with a coated skin 78.

The core 76 of each attaching strip piece 74 of the attaching apparatus 46 is a flexible and non-memory material for allowing the two pair of attaching strip pieces 74 of the attaching apparatus 46 to bend into the one of the pair of front wheel wells 38 of the vehicle 24 when the protector 20 is attached to the front bumper cover 22 of the vehicle 24 and the pair of rear wheel wells 42 of the vehicle 24 when the protector 20 is attached to the rear bumper cover 26 of the vehicle 24 and for allowing the two pair of attaching strip pieces 74 of the attaching apparatus 46 to bend out of the one of the pair of front wheel wells 38 of the vehicle 24 when the protector 20 is to be removed from the front bumper cover 22 of the vehicle 24 and the pair of rear wheel wells 42 of the vehicle 24 when the protector 20 is to be removed from the rear bumper cover 26 of the vehicle 24.

The flexible and non-memory material of the core 76 of each attaching strip piece 74 of the attaching apparatus 46 is made from a metal.

The metal of the flexible and non-memory material of the core 76 of each attaching strip piece 74 of the attaching apparatus 46 is one of aluminum, copper, and combinations thereof.

The coated skin 78 of each attaching strip piece 74 of the attaching apparatus 46 is made from one of vinyl, rubber, and combinations thereof for preventing damage to the one of the front bumper cover 22 of the vehicle 24 from the core 76 of each attaching strip piece 74 of the attaching apparatus 46 when the protector 20 is attached to the front bumper cover 22 of the vehicle 24 and the rear bumper cover 26 of the vehicle 24 from the core 76 of each attaching strip piece 74 of the attaching apparatus 46 when the protector 20 is attached to the rear bumper cover 26 of the vehicle 24.

As shown in FIGS. 5 and 6, the core 76 of each attaching strip piece 74 of the attaching apparatus 46 is made from one of one-piece and multiple pieces depending upon desired flexibility characteristics of the two pair of attaching strip pieces 74 of the attaching apparatus 46.

The attaching apparatus 46 further comprises a pair of suction cup assemblies 80. The pair of suction cup assemblies 80 of the attaching apparatus 46 are for replaceably attaching the pair of wing portions 50 of the body 44 to one of the pair of sides 30 of the front bumper cover 22 of the vehicle, respectively, and the pair of sides 34 of the rear bumper cover 26 of the vehicle 24, respectively.

Each suction cup assembly 80 of the attaching apparatus 46 includes a base plate 82.

The base plate 82 of each suction cup assembly 80 of the attaching apparatus 46 is affixed to the inner layer 58 of the body 44.

The base plate 82 of each suction cup assembly 80 of the attaching apparatus 46 is flexible for conforming to one of the pair of sides 30 of the front bumper cover 22 of the vehicle, respectively, and the pair of sides 34 of the rear bumper cover 26 of the vehicle 24, respectively.

The base plate 82 of each suction cup assembly 80 of the attaching apparatus 46 is transparent for protecting without obscuring one of an associated side 30 of the front bumper cover 22 of the vehicle and an associated side 34 of the rear bumper cover 26 of the vehicle 24.

The base plate 82 of each suction cup assembly 80 of the attaching apparatus 46 is made from one of vinyl, plastic, and rubber.

Each suction cup assembly 80 of the attaching apparatus 46 further includes a plurality of suction cups 84. The plurality of suction cups 84 of each suction cup assembly 80 of the attaching apparatus 46 are for replaceably attaching an associated wing portion 50 of the body 44 to one of an associated side 30 of the front bumper cover 22 of the vehicle and an associated side 34 of the rear bumper cover 26 of the vehicle 24.

The plurality of suction cups 84 of each suction cup assembly 80 of the attaching apparatus 46 are affixed to the base plate 82 of an associated suction cup assembly 80 of the attaching apparatus 46.

The plurality of suction cups 84 of each suction cup assembly 80 of the attaching apparatus 46 are transparent for protecting without obscuring one of an associated side 30 of the front bumper cover 22 of the vehicle and an associated side 34 of the rear bumper cover 26 of the vehicle 24.

The plurality of suction cups 84 of each suction cup assembly 80 of the attaching apparatus 46 are made from one of vinyl, plastic and rubber.

The attaching apparatus 46 further comprises a pair of straps 86.

Each strap 86 of the attaching apparatus 46 includes a proximal end 88, a distal end 90, a pair of opposing axial surfaces 92, and a length.

The distal end 90 of each strap 86 of the attaching apparatus 46 is for entering the trunk 40 of the vehicle 24 when the protector 20 is replaceably attached to the rear bumper cover 26 of the vehicle 24 and is for replaceably attaching to the grille 36 of the vehicle 24 when the protector 20 is replaceably attached to the front bumper cover 22 of the vehicle 24.

The proximal end 88 of each strap 86 of the attaching apparatus 46 passes through an associated through slot 66 of the flap 64 of the body 44, and is maintained thereat, by an adjuster ring 94. The adjuster ring 94 of the proximal end 88 of each strap 86 of the attaching apparatus 46 is for adjusting the length of each strap 86 of the attaching apparatus 46 so as to allow each strap 86 of the attaching apparatus 46 to fit snugly along the top 32 of the rear bumper cover 26 of the vehicle 24 when the protector 20 is replaceably attached to the rear bumper cover 26 of the vehicle 24.

The pair of opposing axial surfaces 92 of each strap 86 of the attaching apparatus 46 have therealong mating portions of hook and loop fasteners 96, respectively, so as to allow the pair of opposing axial surfaces 92 of each strap 86 of the attaching apparatus 46 to replaceably attach to themselves.

The distal end 90 of each strap 86 of the attaching apparatus 46 is folded onto itself so as to form a loop 98 via the mating portions of hook and loop fasteners 96 of an associated strap 86 of the attaching apparatus 46.

The attaching apparatus 46 further comprises a rod 100.

The rod 100 of the attaching apparatus 46 has a pair of ends 102, passes through the loop 98 of the distal end 90 of each strap 86 of the attaching apparatus 46, and is for positioning in, and against, the trunk 40 of the vehicle 24 when the protector 20 is replaceably attached to the rear bumper cover 26 of the vehicle 24.

The rod 100 of the attaching apparatus 46 is telescopic to selectively expand and contract for adjusting to different sized trunks 40 of the vehicle 24.

The pair of ends 102 of the rod 100 of the attaching apparatus 46 are padded for preventing damage to the trunk 40 of the vehicle 24 when the rod 100 of the attaching apparatus 46 rests therein and thereagainst.

Impressions

It will be understood that each of the elements described above, or two or more together, may also find a useful application in other types of constructions differing from the types described above.

While the invention has been illustrated and described as embodiments of a transparent bumper protector, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A protector for replaceably attaching to, and for protecting without obscuring, one of a front bumper cover of a vehicle and a rear bumper cover of the vehicle,
   wherein the front bumper cover of the vehicle has:
     i) a top; and
     ii) a pair of sides;
   wherein the rear bumper cover of the vehicle has:
     i) a top; and
     ii) a pair of sides;
   wherein the vehicle has:
     i) a grille;
     ii) a pair of front wheel wells;
     iii) a trunk; and
     iv) a pair of rear wheel wells; and
   wherein said protector, comprising:
   a) a body; and
   b) an attaching apparatus;
   wherein said body is for overlying without obscuring the one of the front bumper cover of the vehicle and the rear bumper cover of the vehicle;
   wherein said body is for protecting the one of the front bumper cover of the vehicle and the rear bumper cover of the vehicle;
   wherein said attaching apparatus is disposed on said body;
   wherein said attaching apparatus is for replaceably attaching said body to the one of the front bumper cover of the vehicle and the rear bumper cover of the vehicle,
   wherein said body comprises a main portion;
   wherein said main portion of said body is for overlying and protecting the one of the front bumper cover of the vehicle and the rear bumper cover of the vehicle;
   wherein said main portion of said body comprises an imaginary upper boundary;
   wherein said body comprises a flap;
   wherein said flap of said body is for folding over the one of the top of the front bumper cover of the vehicle and the top of the rear bumper cover of the vehicle, and when folding over the top of the rear bumper cover of the vehicle, extends into the trunk of the vehicle;
   wherein said flap of said body extends upwardly from said imaginary upper boundary of said main portion of said body;
   wherein said flap of said body is generally trapezoid-shaped;
   wherein said flap of said body has a pair of through slots; and
   wherein said pair of through slots of said flap of said body are axially spaced-apart from each other.

2. The protector of claim 1, wherein said body comprises a pair of wing portions; and
   wherein said pair of wing portions of said body are for overlying and protecting the one of the pair of sides of the front bumper cover of the vehicle and the pair of sides of the rear bumper cover of the vehicle.

3. The protector of claim 2, wherein said main portion of said body comprises imaginary opposing ends.

4. The protector of claim 3, wherein said pair of wing portions of said body extend outwardly from said imaginary opposing ends of said main portion of said body, respectively.

5. The protector of claim 3, wherein said pair of wing portions of said body extend outwardly from said imaginary opposing ends of said main portion of said body to convex ends, respectively.

6. The protector of claim 3, wherein said pair of wing portions of said body extend taperingly outwardly from said imaginary opposing ends of said main portion of said body to convex ends, respectively.

7. The protector of claim 1, wherein said main portion of said body is generally rectangular-shaped.

8. The protector of claim 1, wherein said body is transparent for protecting without obscuring at least one of the front bumper cover of the vehicle, the rear bumper cover of the vehicle, and a license plate thereon.

9. The protector of claim 1, wherein said body is made from vinyl for conforming to the one of the front bumper cover of the vehicle and the rear bumper cover of the vehicle.

10. The protector of claim 1, wherein said body is made from rubber for conforming to the one of the front bumper cover of the vehicle and the rear bumper cover of the vehicle.

11. The protector of claim 5, wherein said body comprises an inner layer; and
   wherein said inner layer of said body is for overlying and protecting without obscuring the one of the front bumper cover of the vehicle and the rear bumper cover of the vehicle.

12. The protector of claim 11, wherein said body comprises an outer layer.

13. The protector of claim 12, wherein said outer layer of said body overlies said inner layer of said body.

14. The protector of claim 12, wherein said outer layer of said body overlies said inner layer of said body, with a space therebetween; and
   wherein said space of said body is for inserting a bumper sticker therein so as not to have to remove said protector to stick the bumper sticker on the one of the front bumper cover of the vehicle and the rear bumper cover of the vehicle.

15. The protector of claim 12, wherein said body comprises an upper edge.

16. The protector of claim 15, wherein said body comprises a lower edge.

17. The protector of claim 16, wherein said body comprises a pair of tape strips.

18. The protector of claim 17, wherein said pair of tape strips of said body extend axially between said outer layer of said body and said inner layer of said body.

19. The protector of claim 17, wherein said pair of tape strips of said body extend from said convex end of one wing portion of said body to said convex end of the other wing portion of said body.

20. The protector of claim 17, wherein one tape strip of said body extends along said upper edge of said body.

21. The protector of claim 17, wherein the other tape strip of said body extends along said lower edge of said body.

22. The protector of claim 17, wherein said pair of tape strips of said body are vertically spaced-apart from each other.

23. The protector of claim 17, wherein said pair of tape strips of said body are parallel to each other.

24. The protector of claim 17, wherein said pair of tape strips of said body are slender.

25. The protector of claim 17, wherein said pair of tape strips of said body are elongated.

26. The protector of claim 17, wherein said pair of tape strips of said body are reflective.

27. The protector of claim 17, wherein said pair of tape strips of said body are holographic.

28. The protector of claim 17, wherein said attaching apparatus comprises two pair of attaching strip pieces; and
wherein said two pair of attaching strip pieces of said attaching apparatus are for replaceably engaging in one of the pair of front wheel wells of the vehicle when said protector is attached to the front bumper cover of the vehicle and the pair of rear wheel wells of the vehicle when said protector is attached to the rear bumper cover of the vehicle.

29. The protector of claim 28, wherein said two pair of attaching strip pieces of said attaching apparatus extend axially along said pair of wing portions of said body, respectively.

30. The protector of claim 28, wherein said two pair of attaching strip pieces of said attaching apparatus extend axially along said pair of wing portions of said body, respectively, to past said convex ends of said pair of wing portions of said body, respectively.

31. The protector of claim 28, wherein said two pair of attaching strip pieces of said attaching apparatus extend between said outer layer of said body and said inner layer of said body.

32. The protector of claim 28, wherein said two pair of attaching strip pieces of said attaching apparatus are disposed inwardly adjacent to said pair of tape strips of said body, respectively.

33. The protector of claim 28, wherein said two pair of attaching strip pieces of said attaching apparatus are vertically spaced-apart from each other.

34. The protector of claim 28, wherein said two pair of attaching strip pieces of said attaching apparatus are parallel to each other.

35. The protector of claim 28, wherein said two pair of attaching strip pieces of said attaching apparatus are slender.

36. The protector of claim 28, wherein said two pair of attaching strip pieces of said attaching apparatus are elongated.

37. The protector of claim 28, wherein each attaching strip piece of said attaching apparatus comprise a core.

38. The protector of claim 37, wherein each attaching strip piece of said attaching apparatus comprise a coated skin; and
wherein said coated skin of each attaching strip piece of said attaching apparatus coats said core of an associated attaching strip piece of said attaching apparatus.

39. The protector of claim 37, wherein said core of each attaching strip piece of said attaching apparatus is a flexible and non-memory material; and
wherein said flexible and non-memory material of said core of each attaching strip piece of said attaching apparatus is for allowing said two pair of attaching strip pieces of said attaching apparatus to bend into the one of the pair of front wheel wells of the vehicle when said protector is attached to the front bumper cover of the vehicle and the pair of rear wheel wells of the vehicle when said protector is attached to the rear bumper cover of the vehicle and for allowing said two pair of attaching strip pieces of said attaching apparatus to bend out of the one of the pair of front wheel wells of the vehicle when said protector is attached to the front bumper cover of the vehicle and the pair of rear wheel wells of the vehicle when said protector is attached to the rear bumper cover of the vehicle.

40. The protector of claim 39, wherein said flexible and non-memory material of said core of each attaching strip piece of said attaching apparatus is made from a metal.

41. The protector of claim 40, wherein said metal of said flexible and non-memory material of said core of each attaching strip piece of said attaching apparatus is aluminum.

42. The protector of claim 40, wherein said metal of said flexible and non-memory material of said core of each attaching strip piece of said attaching apparatus is copper.

43. The protector of claim 38, wherein said coated skin of each attaching strip piece of said attaching apparatus is made from vinyl; and
wherein said vinyl of said coated skin of each attaching strip piece of said attaching apparatus is for preventing damage to the one of the front bumper cover of the vehicle, from said core of each attaching strip piece of said attaching apparatus when said protector is attached to the front bumper cover of the vehicle, and said rear bumper cover of said vehicle, from said core of each attaching strip piece of said attaching apparatus when said protector is attached to the rear bumper cover of the vehicle.

44. The protector of claim 38, wherein said coated skin of each attaching strip piece of said attaching apparatus is made from rubber; and
wherein said rubber of said coated skin of each attaching strip piece of said attaching apparatus is for preventing damage to the one of the front bumper cover of the vehicle, from said core of each attaching strip piece of said attaching apparatus when said protector is attached to the front bumper cover of the vehicle and said rear bumper cover of said vehicle, from said core of each attaching strip piece of said attaching apparatus when said protector is attached to the rear bumper cover of the vehicle.

45. The protector of claim 37, wherein said core of each attaching strip piece of the attaching apparatus is made from one-piece.

46. The protector of claim 37, wherein said core of each attaching strip piece of the attaching apparatus is made from multiple pieces.

47. The protector of claim 11, wherein said attaching apparatus comprises a pair of suction cup assemblies; and
wherein said pair of suction cup assemblies of said attaching apparatus are for replaceably attaching said pair of wing portions of said body to one of the pair of sides of the front bumper cover of the vehicle, respectively, and the pair of sides of the rear bumper cover of the vehicle, respectively.

48. The protector of claim 47, wherein each suction cup assembly of said attaching apparatus includes a base plate.

49. The protector of claim 48, wherein said base plate of each suction cup assembly of said attaching apparatus is affixed to said inner layer of said body.

50. The protector of claim 48, wherein said base plate of each suction cup assembly of said attaching apparatus is flexible for conforming to one of the pair of sides of the front bumper cover of the vehicle, respectively, and the pair of sides of the rear bumper cover of the vehicle, respectively.

51. The protector of claim 48, wherein said base plate of each suction cup assembly of said attaching apparatus is transparent for protecting without obscuring one of an associated side of the front bumper cover of the vehicle and an associated side of the rear bumper cover of the vehicle.

52. The protector of claim 48, wherein said base plate of each suction cup assembly of said attaching apparatus is made from vinyl.

53. The protector of claim 48, wherein said base plate of each suction cup assembly of said attaching apparatus is made from plastic.

54. The protector of claim 48, wherein said base plate of each suction cup assembly of said attaching apparatus is made from rubber.

55. The protector of claim 48, wherein each suction cup assembly of said attaching apparatus includes a plurality of suction cups; and
wherein said plurality of suction cups of each suction cup assembly of said attaching apparatus are for replaceably attaching an associated wing portion of said body to one of an associated side of the front bumper cover of the vehicle and an associated side of the rear bumper cover of the vehicle.

56. The protector of claim 55, wherein said plurality of suction cups of each suction cup assembly of said attaching apparatus are affixed to said base plate of an associated suction cup assembly of said attaching apparatus.

57. The protector of claim 55, wherein said plurality of suction cups of each suction cup assembly of said attaching apparatus are transparent for protecting without obscuring one of an associated side of the front bumper cover of the vehicle and an associated side of the rear bumper cover of the vehicle.

58. The protector of claim 55, wherein said plurality of suction cups of each suction cup assembly of said attaching apparatus are made from vinyl.

59. The protector of claim 55, wherein said plurality of suction cups of each suction cup assembly of said attaching apparatus are made from plastic.

60. The protector of claim 55, wherein said plurality of suction cups of each suction cup assembly of said attaching apparatus are made from rubber.

61. The protector of claim 1, wherein said attaching apparatus comprises a pair of straps.

62. The protector of claim 61, wherein each strap of said attaching apparatus includes a proximal end.

63. The protector of claim 61, wherein each strap of said attaching apparatus includes a distal end;
wherein said distal end of each strap of said attaching apparatus is for entering the trunk of the vehicle when said protector is replaceably attached to the rear bumper cover of the vehicle; and
wherein said distal end of each strap of said attaching apparatus is for replaceably attaching to the grille of the vehicle when said protector is replaceably attached to the front bumper cover of the vehicle.

64. The protector of claim 63, wherein each strap of said attaching apparatus includes a pair of opposing axial surfaces.

65. The protector of claim 62, wherein each strap of said attaching apparatus includes a length.

66. The protector of claim 62, wherein said proximal end of each strap of said attaching apparatus passes through an associated through slot of said flap of said body.

67. The protector of claim 65, wherein said proximal end of each strap of said attaching apparatus passes through an associated through slot of said flap of said body, and is maintained thereat, by an adjuster ring; and
wherein said adjuster ring of said proximal end of each strap of said attaching apparatus is for adjusting said length of each strap of said attaching apparatus so as to allow each strap of said attaching apparatus to fit snugly along the top of the rear bumper cover of the vehicle when said protector is replaceably attached to the rear bumper cover of the vehicle.

68. The protector of claim 64, wherein said pair of opposing axial surfaces of each strap of said attaching apparatus have therealong mating portions of hook and loop fasteners, respectively, so as to allow said pair of opposing axial surfaces of each strap of said attaching apparatus to replaceably attach to themselves.

69. The protector of claim 63, wherein said distal end of each strap of said attaching apparatus is folded onto itself so as to form a loop.

70. The protector of claim 68, wherein said distal end of each strap of said attaching apparatus is folded onto itself so as to form a loop via said mating portions of hook and loop fasteners of an associated strap of said attaching apparatus.

71. The protector of claim 69, wherein said attaching apparatus comprises a rod; and
wherein said rod of said attaching apparatus is for positioning in, and against, the trunk of the vehicle when said protector is replaceably attached to the rear bumper cover of the vehicle.

72. The protector of claim 71, wherein said rod of said attaching apparatus has a pair of ends.

73. The protector of claim 71, wherein said rod of said attaching apparatus passes through said loop of said distal end of each strap of said attaching apparatus.

74. The protector of claim 71, wherein said rod of said attaching apparatus is telescopic to selectively expand and contract for adjusting to different sized trunks of the vehicle.

75. The protector of claim 72, wherein said pair of ends of said rod of said attaching apparatus are padded for preventing damage to the trunk of the vehicle when said rod of said attaching apparatus rests therein and thereagainst.

* * * * *